United States Patent
Ding et al.

(10) Patent No.: US 11,580,441 B2
(45) Date of Patent: Feb. 14, 2023

(54) MODEL TRAINING METHOD AND APPARATUS

(71) Applicant: Alibaba Group Holding Limited, Grand Cayman (KY)

(72) Inventors: Yi Ding, Hangzhou (CN); Jin Yu, Hangzhou (CN); Huaidong Xiong, Hangzhou (CN); Xu Chen, Hangzhou (CN)

( * ) Notice: Subject to any disclaimer, the term of this patent is extended or adjusted under 35 U.S.C. 154(b) by 1175 days.

(21) Appl. No.: 16/146,642

(22) Filed: Sep. 28, 2018

(65) Prior Publication Data
US 2019/0034833 A1 Jan. 31, 2019

Related U.S. Application Data

(63) Continuation of application No. PCT/CN2017/077696, filed on Mar. 22, 2017.

(30) Foreign Application Priority Data

Mar. 31, 2016 (CN) .......................... 201610201951.4

(51) Int. Cl.
*G06N 20/00* (2019.01)
*G06K 9/62* (2022.01)

(52) U.S. Cl.
CPC ........... *G06N 20/00* (2019.01); *G06K 9/6256* (2013.01); *G06K 9/6269* (2013.01)

(58) Field of Classification Search
CPC ..... G06N 20/00; G06K 9/6256; G06K 9/6269
See application file for complete search history.

(56) References Cited

U.S. PATENT DOCUMENTS

| 5,621,861 A | 4/1997 | Hayashi et al. |
| 9,569,401 B2 | 2/2017 | Pechyony et al. |

(Continued)

FOREIGN PATENT DOCUMENTS

| CN | 102663417 A | 9/2012 |
| CN | 104732241 A | 6/2015 |

(Continued)

OTHER PUBLICATIONS

Translation of International Search Report from corresponding Chinese PCT Application No. PCT/CN2017/077696, dated Jul. 10, 2017, 2 pages.

(Continued)

*Primary Examiner* — Dangelino N Gortayo
(74) *Attorney, Agent, or Firm* — Lee & Hayes, P.C.

(57) ABSTRACT

A model training method and an apparatus thereof are provided. The method includes reading a portion of sample data in a sample full set to form a sample subset; mapping a model parameter related to the portion of sample data from a first feature component for the sample full set to a second feature component for the sample subset; and training a model based on the portion of sample data having the second feature component. A size of a copy of model parameters(s) on a sample computer can be reduced after mapping, thus greatly reducing an amount of training data and minimizing the occupancy of memory of the computer. Memory of a sample computer is used to place vectors, and store and load samples, thereby performing machine learning and training large-scale models with relatively low resource overhead under a condition of minimizing the loss of efficiency.

20 Claims, 2 Drawing Sheets (56) References Cited

U.S. PATENT DOCUMENTS

| | | | |
|---|---|---|---|
| 10,318,882 B2* | 6/2019 | Brueckner | H04L 67/10 |
| 10,558,933 B2* | 2/2020 | Bhowan | G06F 16/9024 |
| 2010/0205120 A1* | 8/2010 | Zou | G06K 9/6253 |
| | | | 704/250 |
| 2017/0220949 A1 | 8/2017 | Feng et al. | |
| 2017/0337487 A1* | 11/2017 | Nock | G06N 3/08 |
| 2018/0005136 A1* | 1/2018 | Gai | G06N 20/00 |
| 2018/0247200 A1* | 8/2018 | Rolfe | G06N 3/0454 |
| 2018/0308007 A1* | 10/2018 | Amin | G06N 3/0472 |

FOREIGN PATENT DOCUMENTS

| | | |
|---|---|---|
| CN | 104866524 A | 8/2015 |
| CN | 105426857 A | 3/2016 |

OTHER PUBLICATIONS

Translation of Written Opinion from corresponding Chinese PCT Application No. PCT/CN2017/077696, dated Jul. 10, 2017, 5 pages.
Translation of CN Office Action from Corresponding CN Application No. 201610201951.4 dated Feb. 25, 2020, a counterpart foreign application for U.S. Appl. No. 16/146,642, 5 pages.
Machine Translated Chinese Second Office Action for CN application No. 20161020195.1 dated Aug. 26, 2020, 5 pages.

\* cited by examiner

MODEL TRAINING METHOD AND APPARATUS

CROSS REFERENCE TO RELATED PATENT APPLICATIONS

This application claims priority to and is a continuation of PCT Patent Application No. PCT/CN2017/077696 filed on 22 Mar. 2017, and is related to and claims priority to Chinese Patent Application No. 201610201951.4, filed on 31 Mar. 2016, entitled "Model Training Method and Apparatus," which are hereby incorporated by reference in their entirety.

TECHNICAL FIELD

The present disclosure relates to the technical field of computer processing, and particularly to model training methods and apparatuses.

BACKGROUND

With the rapid development of the Internet, all aspects of people's lives have been linked to the Internet. When people use relevant functions of the Internet, a huge amount of data is generated.

At present, this tremendous amount of data is often mined using model training in machine learning to perform operations such as classification, recommendation, and the like.

In model learning, due to a huge amount of sample data involved in the training, a model becomes very huge, with hundreds of millions or even billions of floating point numbers being used to form the model, which increases the difficulty of storage and the time of calculation of training, resulting in the difficulty of training.

At present, distributed machine learning provides a method for machine learning and model training through a large-scale computer cluster, which is usually built on a computer cluster composed of a large number of computers, and performs cluster scheduling, resource management and task control through a distributed operating system.

Under normal circumstances, large-scale machine learning needs to face two important kinds of parameters:

1. Model Parameters.

In a process of machine learning, model parameters are updated due to calculation of a training algorithm and are constantly changing. At the same time, in order to obtain a final model parameter result, the training algorithm often needs multiple vectors of different lengths to participate in the calculation. Since the number of model parameters in the process of training is usually hundreds of millions or even tens of billions of floating point numbers, these model parameters need to use storage resources of a computer cluster for storage.

2. Sample Data.

An amount of sample data often directly affects the effect of a machine learning algorithm. Without a large amount of sample data, the desired effect of model training cannot be achieved. In order to obtain a reasonable model, tens of billions of sample data may be needed.

Since a training process of machine learning needs to go through a lot of iterative processes, all sample data that is involved in model training is used repeatedly. To minimize the time for training to obtain a model, the sample data is generally stored in computer memory, which requires huge size of computer memory.

However, storage resources cannot grow indefinitely in a computer cluster. If these pieces of sample data are put into internal storage, the access efficiency can be guaranteed. However, memory of a single computer is undoubtedly limited. In face of a massive amount of sample data, a large number of computer hosts are often required, which brings various problems such as network and cluster management.

If the sample data is stored in external storage devices, the tasks of training cannot guarantee high speed and high efficiency due to the slow access speed and time delay of associated storage media.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, embodiments of the present disclosure are proposed to provide a model training method and a corresponding model training apparatus to overcome the above problems or at least partially solve the above problems.

In order to solve the above problems, the present disclosure discloses a model training method, which includes reading a portion of sample data in a sample full set to form a sample subset; mapping a model parameter related to the portion of sample data from a first feature component for the sample full set to a second feature component for the sample subset; and training a model based on the portion of sample data having the second feature component.

In implementations, reading the portion of sample data in the sample full set to form the sample subset includes reading the portion of sample data in the sample full set from a file storage system; and writing the portion of sample data into a specified area in the file storage system to form the sample subset.

In implementations, mapping the model parameter related to the portion of sample data from the first feature component for the sample full set to the second feature component for the sample subset includes establishing a mapping relationship vector between the first feature component for the sample full set and the second feature component for the sample subset for the model parameter related to the portion of sample data; and mapping the model parameter related to the portion of sample data from the first feature component for the sample full set to the second feature component for the sample subset according to the mapping relationship vector.

In implementations, training the model based on the portion of sample data having the second feature component includes reading the portion of sample data in each iteration; using the portion of sample data for training to obtain a training result; mapping the model parameter related to the portion of sample data from the second feature component for the sample subset to the first feature component for the sample full set; and sending a training result corresponding to the first feature component to a vector computer to update a model parameter corresponding to the first feature component in the model.

In implementations, reading the sample data in the sample subset includes reading sample data of a sample subset pre-stored in a current sample computer; or reading sample data from a sample subset pre-stored in another sample computer when receiving sample transfer information of the other sample computer.

In implementations, mapping the model parameter related to the portion of sample data from the second feature component for the sample subset to the first feature component for the sample full set includes reading a preset mapping relationship vector; and mapping the model parameter related to the portion of sample data from the second feature component for the sample subset to the first feature component for the sample full set according to the mapping relationship vector.

In implementations, sending the training result corresponding to the first feature component to the vector computer includes adding a character sequence, the character sequence including an update identifier for the first feature component and a prohibit-to-update identifier for other feature components, the other feature component being feature components of the sample full set other than the first feature component; and sending the character sequence and the training result to the vector computer.

The embodiments of the present disclosure also disclose a model training apparatus, which includes a sample subset reading module configured to read a portion of sample data in a sample full set to form a sample subset; a feature vector mapping module configured to a map model parameter related to the portion of sample data from a first feature component for the sample full set to a second feature component for the sample subset; and a model training module configured to train a model based on the portion of sample data having the second feature component.

In implementations, the sample subset reading module includes a partial sample data reading sub-module configured to read the portion of sample data in the sample full set from a file storage system; and a partial sample data writing sub-module configured to write the portion of sample data into a specified area in the file storage system to form the sample subset.

In implementations, the feature vector mapping module includes a mapping relationship vector establishing sub-module configured to establish a mapping relationship vector between the first feature component for the sample full set and the second feature component for the sample subset for the model parameter related to the portion of sample data; and a sample subset mapping sub-module configured to map the model parameter related to the portion of sample data from the first feature component for the sample full set to the second feature component for the sample subset according to the mapping relationship vector.

In implementations, the model training module includes a second partial sample data reading sub-module configured to read the portion of sample data in each iteration; a training sub-module configured to use the portion of sample data for training to obtain a training result; a sample full set mapping sub-module configured to map the model parameter related to the portion of sample data from the second feature component for the sample subset to the first feature component for the sample full set; and a communication sub-module configured to send a training result corresponding to the first feature component to a vector computer to update model parameter corresponding to the first feature component in the model.

In implementations, the second partial sample data reading sub-module includes a first reading unit configured to read sample data of a sample subset pre-stored in a current sample computer; or a second reading unit configured to read sample data from a sample subset pre-stored in another sample computer when receiving sample transfer information of the other sample computer.

In implementations, the sample full set mapping sub-module includes a mapping relationship vector reading unit configured to read a preset mapping relationship vector; and a mapping relationship mapping unit configured to map the model parameter related to the portion of sample data from the second feature component for the sample subset to the first feature component for the sample full set according to the mapping relationship vector.

In implementations, the communication sub-module includes a character sequence adding unit configured to add a character sequence, the character sequence including an update identifier for the first feature component and a prohibit-to-update identifier for other feature components, the other feature component being feature components of the sample full set other than the first feature component; and a sending unit configured to add the character sequence and the training result to the vector computer.

The embodiments of the present disclosure include the following advantages.

The embodiments of the present disclosure take advantage of the locality of sample data carried by a single sample computer, read a portion of sample data in a sample full set to form a sample subset, and map model parameter(s) related to the portion of sample data to first feature component(s) for the sample full set to second feature component(s) for the sample subset, and train a model based on the portion of sample data having the second feature component(s).

First, a size of a copy of model parameters(s) on a sample computer can be reduced after mapping, thus greatly reducing an amount of training data and minimizing the occupancy of memory of the computer. The memory of the sample computer is used to place vectors, and store and load samples, thereby performing machine learning and training large-scale models with relatively low resource overhead under a condition of minimizing the loss of efficiency.

Second, mapping has no effect on the computational performance of a process of model training, and is transparent to a training algorithm. Thus, an original training algorithm can be used without modification.

The embodiments of the present disclosure flexibly process sample data, and can effectively distribute the workload associated with the sample data to different sample computers in parallel, thus avoiding the drop in efficiency caused by a "long tail", and easily increasing a size of a model or increasing an amount of sample data by adding hardware devices.

The embodiments of the present disclosure conduct communications through a character sequence, and the number of bytes that are used is smaller than the number of bytes for directly transmitting floating point data, thus reducing the consumption of communication resources of a duster.

DETAILED DESCRIPTION

To enable the foregoing purposes, features and advantages of the present disclosure to be understood more clearly and easily, the present disclosure is described in detail hereinafter in conjunction with the accompanying drawings and specific implementations.

Figure 1:
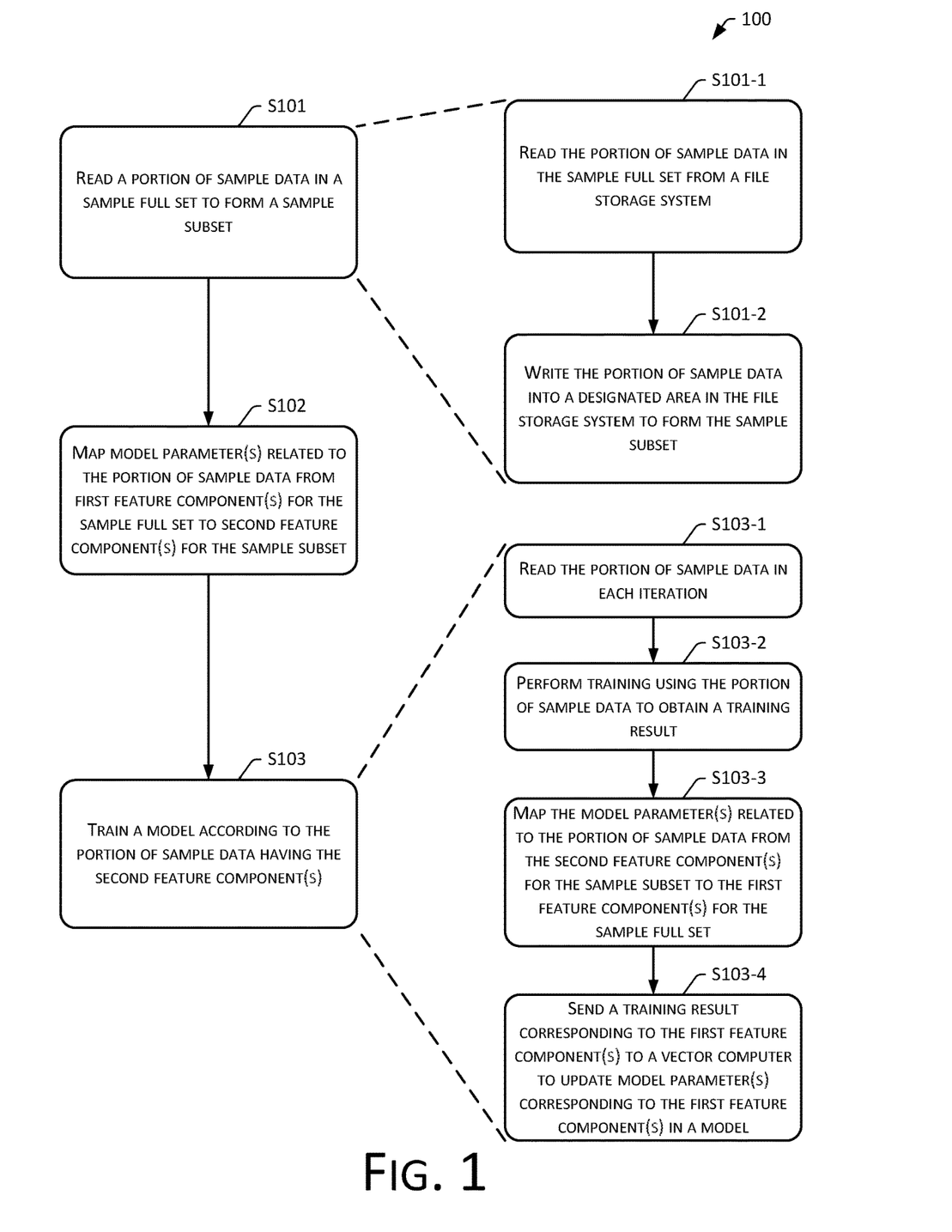
FIG. 1 is a flowchart of an embodiment of a model training method in accordance with the present disclosure.

Referring to FIG. 1, a flowchart of an embodiment of a model training method 100 of the present disclosure is shown, which may specifically include the following operations.

Operation S101: Read a portion of sample data in a sample full set to form a sample subset.

In implementations, original sample data can be collected through a website log or the like.

For example, original sample data is assumed to be user activity information, and is used for training a classification model to recommend relevant information. A general website log can record which page of a website is accessed from which IP (Internet Protocol, a protocol of interconnection between networks) address of a computer of a user at which time with what operating system, browser and display are used, and whether an associated access is successful.

However, the demand for user activity information is usually not an IP address of a computer of a user, an operating system, a browser, and other robot data, but activity information that can represent interests of the user, such as what information the user browses, an activity representing a degree of interest, etc.

Apparently, the sample data that is mentioned above is only an example. When the embodiments of the present disclosure are implemented, other sample data may be set according to actual conditions, which is not limited by the embodiments of the present disclosure.

Before the sample data is used for training a model, pre-processing can be performed on the original sample data, such as removing dirty words and high-frequency words, removing robot data, removing noise (such as data having little access information or random behavior), etc., to become standardized sample data.

The embodiments of the present disclosure can be applied to a computer cluster, such as a distributed system. The computer cluster includes a file storage system, one or more sample computers, and one or more vector computers.

The file storage system can store a sample full set, i.e., a set of all sample data. An example of the file storage system is a distributed file system, for example, NFS (Network File System), Coda, AFS (Andrew File System), Sprite File System, HDFS (Hadoop Distributed File System), Pangu system, etc. All samples are readable by a computer.

A sample computer can read a portion of sample data from the file storage system to train a model, and record model parameters related to the sample data read thereby. The portion of sample data can be called a sample subset. Model training for the sample data in the sample subset is performed according to a training algorithm of the model.

A vector computer is used for storing vector(s) of the model, performing vector calculations, and outputting vector(s).

The model can usually be represented as a vector or a set of vectors, with each dimension in the vector being called as a model parameter.

Sample data is usually expressed as weight(s) for one or a set of model parameters.

An example of a certain model is given as follows:
[0.1, 0.2, 0.3, 0, 0, 0.4, 0.5, 0.6, 0.7, 0.8]

In this example, a 10-dimensional linear model is represented. The model has a total of 10 model parameters, such as 0.1, 0.2, etc.

Value of the model parameters are generally obtained by training the sample data.

For example, a sample of data can be generated from a single click of a user through a browser page on the Internet. Each sample data may contain model parameters involved in the respective sample data.

An example of certain sample data is given as follows:
(1:0.01, 3:0.02, 8:0.03)

In this example, the sample data represents a weight of 0.01 for a model parameter with an ID as 1 and a weight of 0.02 for a model parameter with an ID as 3, and 0.03 for a model parameter with an ID as 8, i.e., this sample data affects three model parameters in a model.

Generally speaking, different sample data will affect different model parameters. Using a training algorithm in machine learning, a model based on such sample set can be obtained through training of a large amount of sample data.

In implementations, operation S101 may include the following sub-operations.

Sub-operation S101-1: Read the portion of sample data in the sample full set from a file storage system.

Sub-operation S101-2: Write the portion of sample data into a designated area in the file storage system to form the sample subset.

In implementations, the sample full set may be stored in a file storage system, area(s) being readable by all sample computers. A sample computer may read some samples from a sample full set in a random manner, and write back to the file storage system. Area(s) readable by the sample computer quickly realize(s) segmentation and distribution of the sample full set.

In general, since each sample computer reads a portion of sample data, the total number of associated model parameters is much smaller than dimensions of a model.

Apparently, the foregoing manner of reading sample data is only an example. When the embodiments of the present disclosure are implemented, other manners of reading sample data may be set according to actual conditions, such as a sample full set being divided and then read by sample computers, etc., which are not limited by the embodiments of the present disclosure.

Operation S102: Map model parameter(s) related to the portion of sample data from first feature component(s) for the sample full set to second feature component(s) for the sample subset.

Many model training algorithms of machine learning generally do not need to exchange data between sample computers that carry sample data during an entire process of model training.

This sample subset is related to four model parameters of first feature components of 1, 3, 6 and 8 in the sample full set. In mapping, the four model parameters can be represented using second feature components 1, 2, 3 and 4 according to a sequence.

As such, a mapping relationship vector of this sample subset is: [1:1, 2:3, 3:6:4:8].

After mapping, the number of model parameters contained in the sample subset is 4 instead of 10:
Sample data 1: (1:0.01, 2:0.02, 4:0.03)
Sample data 2: (3:0.02)

For different model parameters, first feature components of a same model parameter may correspond to different second feature components due to different mapping relationship vectors.

For example, for a market having a large number of online sales, many stores selling a same product (with a same first feature component) may exist, and users click this product in these online stores through multiple sources (search engines, recommendations, etc.).

If these click records are used as sample data, different mapping relationship vectors may very likely be obtained on different sample computers due to different sample data assigned to each sample computer. Therefore, different second feature components may very likely be obtained for the product in different mapping relationship vectors.

For example, in the original product in the above example, for a first feature component of the sample full set is 100, a second feature component obtained in a mapping relationship vector is 50. Therefore, the first feature component of 100 in the sample subset can be converted into the new second feature component of 50.

Since each sample computer reads a portion of the sample data, the total number of related model parameters is much smaller than the number of dimensions of a model. Therefore, a data amount of the second feature component for the sample subset is much smaller than that of the first feature component for the sample full set. A mapping operation can greatly compress a data amount of sample data.

Since a relative number of each sample subset is relatively small and no correlation among sample subsets exist, this mapping operation can be done in parallel on different sample computers.

Operation S103: Train a model according to the portion of sample data having the second feature component(s).

After the mapping is completed, a sample full set of a large amount of original data is divided into multiple triples:

(sample subset, model parameters, mapping relationship vector)

For each triple, a sample computer can read sample data and a mapping relationship vector from a file storage system and save the sample data and the mapping relationship vector to its own memory.

Model training can be performed for each triple that is stored in the memory.

A gradient descent optimization is used as an example. In this training method, a vector of a model is stored in a vector computer in a piecewise manner. A sample computer calculates a gradient and a loss value (i.e., an optimization objective function) for sample data that the sample computer is responsible for, pushes a calculation result to the vector computer, and obtains the latest value of a gradient from the vector computer for a next iteration.

The embodiments of the present disclosure utilize the locality of sample data carried by a single sample computer, read a portion of sample data in a sample set to form a sample subset, map model parameters related to the portion of sample data from first feature component(s) for the sample complete set to second feature component(s) for the sample subset, and train a model based on the portion of sample data having the second feature component(s).

First, after mapping, a size of copy of model parameters on a sample computer can be reduced, thus greatly reducing an amount of training data and minimizing the occupancy of memory of the computer. A sample computer memory is used to place vectors, and store and load samples, thereby performing machine learning and training large-scale models with relatively low resource overhead under a condition of minimizing the loss of efficiency.

Second, the mapping has no effect on the computational performance of a process of training a model, and is transparent to a training algorithm. An original training algorithm can be used without modification.

In implementations, operation S103 may include the following sub-operations.

Sub-operation S103-1: Read the portion of sample data in each iteration.

In one case, a current sample computer can read sample data from a sample subset that is previously stored by the current sample computer.

Alternatively, in another case, since the number of sample computers is limited and an amount of sample data is large, each sample computer may read multiple sample subsets.

In implementations, a sample subset can be dynamically transferred. In response to receiving sample transfer information of other sample computers, a current sample computer can read sample data of sample subsets that are stored in the other sample computers through methods such as obtaining read permission, transferring storage areas of the sample subsets, and the like.

In implementations, the storage space is reduced and the reading speed is increased because the sample data has been converted at this time.

A local copy of model parameters typically contains only those components that the sample computer really needs, rather than requiring all of the components. As such, this can lead to a significant saving in local space, and enable triples to load sample data when actually used, thereby ensuring that an entire process of training is carried out in the memory of the sample computer or vector computer, and achieving the purpose of large-scale model training in a highly efficient manner.

If each sample computer is only responsible for sample subset(s) read thereby, the efficiency of training is degraded due to a "long tail" of data if one sample computer has a relatively high number of remaining sample subsets while the other sample computers are in an idle state.

The embodiments of the present disclosure flexibly process sample data, and can effectively distribute the load of the sample data to different sample computers in parallel, thus avoiding a drop in efficiency caused by the "long tail", and easily increasing a model size or increasing an amount of sample data by adding hardware devices.

Sub-operation S103-2: Perform training using the portion of sample data to obtain a training result.

Training methods are generally different for different models, and training results obtained therefor are generally different.

For example, for a convex optimization model obtained by gradient descent optimization, a training result is a polynomial of weights.

For another example, for a random forest, a training result is a decision tree.

At this time, a training result obtained by the training of the sample computer is directed to the triple, that is, a subscript thereof is not equal to a subscript value on the vector computer.

Since each triple contains only subscripts involved in the respective triple, an amount of data is greatly reduced, which greatly saves memory usage and improves training speed in a sparse model training process.

Sub-operation S103-3: Map the model parameter(s) related to the portion of sample data from the second feature component(s) for the sample subset to the first feature component(s) for the sample full set.

After completing the calculation of each triple, the sample computer pushes a training result to the vector computer.

Before pushing, a mapping relationship vector in a triple can be used to convert a subscript of a training result into a subscript on the vector computer.

This process is performed by the sample computer itself before communication. The training algorithm does not perceive this process. In other words, the mapping conversion of the subscript is transparent to the training algorithm, and is independent of the training algorithm. The training algorithm itself is responsible for the calculation.

In a specific implementation, the preset mapping relationship vector may be read from a location such as a file storage system, and the model parameter(s) related to the portion of sample data are mapped from the second feature component(s) for the sample subset to the first feature component(s) for the sample full set according to the mapping relationship vector.

For example, for the sample 1 in the above example, the sample data in the sample subset is (1:0.01, 2:0.02, 4:0.03) Training weights are assumed to be [1:0.05, 2:0.06, 3:0, 4:0.07] (a reason why the third value is 0 is that this piece of sample data does not affect the model parameter with ID 3).

The mapping relationship vector is known to be [1:1, 2:3, 3:6:4:8]. Therefore, the sample data can be mapped and combined with gradient values to obtain a vector [1:0.05, 3:0.06, 6:0, 8:0.07], and all model parameters have been restored to the first feature components for the sample full set, rather than the second feature components of the sample subset.

Sub-operation S103-4: Send a training result corresponding to the first feature component(s) to a vector computer to update model parameter(s) corresponding to the first feature component(s) in a model.

To reduce communication data, a character sequence can be added to a transmitted data packet to send the character sequence and the training result to the vector computer.

Bits of the character sequence include an update identifier for the first feature component(s) and a prohibit-to-update identifier for other feature components, and the other feature components are feature components of the sample full set other than the first feature component(s).

If a certain communication needs to update model parameters of a first feature component from 1000 to 5000 on a vector computer, one (5000-1000)/8, i.e., a sequence of characters of about 500 bytes can be simultaneously transmitted by applying the embodiments of the present disclosure. Each bit indicates whether a current communication is to update corresponding model parameters (e.g., 0 means no update, 1 means update). Furthermore, corresponding new model parameters can be transmitted sequentially, to avoid a large number of 0 values being transmitted on a network.

For example, a vector to be pushed in the above example is [1:0.05, 3:0.06, 6:0, 8:0.07], and a character sequence added in the communication is [1010010100], indicating that model parameters of first feature components are 1, 3, 6 and 8 need to be updated, and real data is represented by three values [0.05, 0.06, 0.07].

In this way, the number of bytes passed by the entire communication: 10 bit+3×32 bit=106 bits (assuming that floating point numbers are represented by 4 bytes), which is much smaller than 10×32 bit=320 bits required for directly transferring the floating point numbers.

In gradient descent optimization, if a vector computer receives a new batch of gradients, a gradient vector of the model is updated. After receiving results of all the triples, a gradient value of the current round is determined, and then a model vector is updated and returned to each sample computer to continue a next iteration of training.

After the iterative model training ends, the vector computer writes a model vector stored thereby to an externally stored file storage system or database table in a form such as a "key-value" equivalent form, and outputs the trained model.

The embodiments of the present disclosure conduct communications through a character sequence, and the number of bytes that are used is smaller than the number of bytes for directly transferring floating point data, thus reducing the consumption of communication resources of a cluster.

It should be noted that the method embodiments are all expressed as series of action combinations for the brevity of description. However, one skilled in the art should understand that the embodiments of the present disclosure are not limited by the described actions sequence, because certain operations may be performed in other orders or concurrently in accordance with the embodiments of the present disclosure. Furthermore, one skilled in the art should also understand that the embodiments described in the specification are all exemplary embodiments, and actions involved therein may not be necessarily required in the embodiments of the present disclosure.

Figure 2:
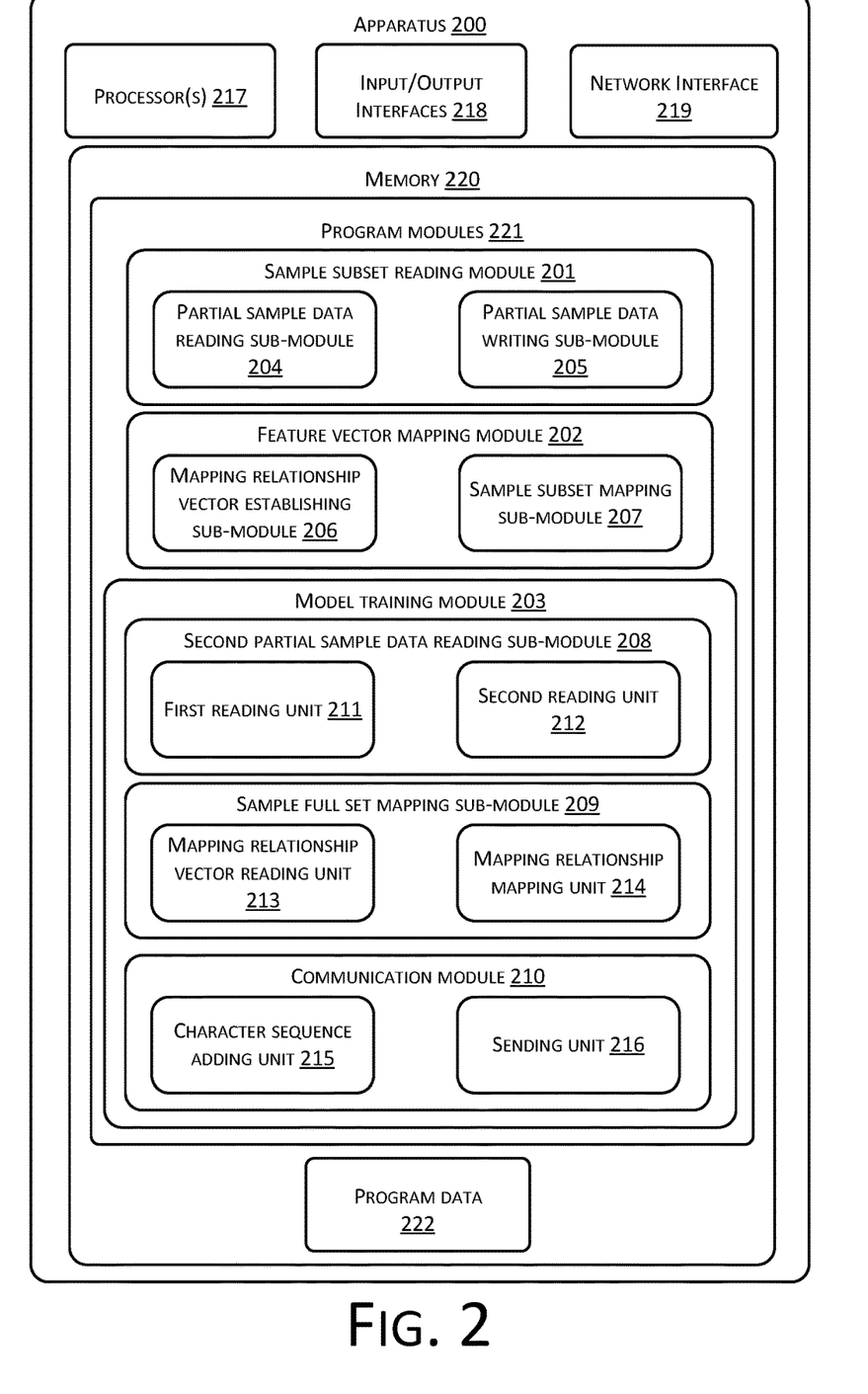
FIG. 2 is a structural block diagram of an embodiment of a model training apparatus in accordance with the present disclosure.

Referring to FIG. 2, a structural block diagram of an embodiment of a model training apparatus 200 in accordance with the present disclosure is shown. In implementations, the apparatus 200 may include one or more computing devices. In implementations, the apparatus 200 may be a part of one or more computing devices, e.g., implemented or run by the one or more computing devices. In implementations, the one or more computing devices may be located in a single place or distributed among a plurality of network devices over a network. In a typical configuration, a computing device includes one or more processors (CPU), an input/output interface, a network interface, and memory. By way of example and not limitation, the apparatus 200 may include the following modules.

A sample subset reading module 201 is configured to read a portion of sample data in a sample full set to form a sample subset.

A feature vector mapping module 202 is configured to map model parameter(s) related to the portion of sample data from first feature component(s) for the sample full set to second feature component(s) for the sample subset.

A model training module 203 is configured to train a model based on the portion of sample data having the second feature component(s).

In implementations, the sample subset reading module 201 may include a partial sample data reading sub-module 204 configured to read the portion of sample data in the sample full set from a file storage system; and a partial sample data writing sub-module 205 configured to write the portion of sample data into a specified area in the file storage system to form the sample subset.

In implementations, the feature vector mapping module 202 may include a mapping relationship vector establishing sub-module 206 configured to establish a mapping relationship vector between the first feature components) for the sample full set and the second feature components) for the sample subset for the model parameters related to the portion of sample data; and a sample subset mapping sub-module 207 configured to map the model parameter(s) related to the portion of sample data from the first feature components) for the sample full set to the second feature components) for the sample subset according to the mapping relationship vector.

In implementations, the model training module 203 may include a second partial sample data reading sub-module 208 configured to read the portion of sample data in each iteration; a training sub-module configured to use the portion of sample data for training to obtain a training result; a sample full set mapping sub-module 209 configured to map the model parameter(s) related to the portion of sample data from the second feature components) for the sample subset to the first feature components) for the sample full set; and a communication sub-module 210 configured to send a training result corresponding to the first feature components) to a vector computer to update model parameters corresponding to the first feature components) in the model.

In implementations, the second partial sample data reading sub-module 208 may include a first reading unit 211 configured to read sample data of a sample subset pre-stored in a current sample computer; or a second reading unit 212 configured to read sample data from a sample subset pre-stored in another sample computer when receiving sample transfer information of the other sample computer.

In implementations, the sample full set mapping sub-module 209 may include a mapping relationship vector reading unit 213 configured to read a preset mapping relationship vector; and a mapping relationship mapping unit 214 configured to map the model parameter(s) related to the portion of sample data from the second feature components) for the sample subset to the first feature components) for the sample full set according to the mapping relationship vector.

In implementations, the communication sub-module 210 may include a character sequence adding unit 215 configured to add a character sequence, the character sequence including an update identifier for the first feature components) and a prohibit-to-update identifier for other feature components, the other feature component being feature components of the sample full set other than the first feature component(s); and a sending unit 216 configured to add the character sequence and the training result to the vector computer.

In implementations, the apparatus 200 may also include one or more processors 217, an input/output (I/O) interface 218, a network interface 219, and memory 220.

The memory 220 may include a form of computer readable media such as a volatile memory, a random access memory (RAM) and/or a non-volatile memory, for example, a read-only memory (ROM) or a flash RAM. The memory 220 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 220 may include program modules 221 and program data 222. The program modules 221 may include one or more of the foregoing modules, sub-modules, and/or units as described in FIG. 2.

Due to their basically similarities to the method embodiments, the description of the apparatus embodiments is relatively simple, and relevant parts can be referenced to the description of the method embodiments.

Each embodiment in the present specification is described in a progressive manner, and each embodiment has an emphasis that is different from those of other embodiments. Same or similar parts among the embodiments can be referenced with each other.

One skilled in the art should understand that the embodiments of the present disclosure can be provided as a method, an apparatus, or a computer program product. Therefore, the embodiments of the present disclosure may take a form of a complete hardware embodiment, a complete software embodiment, or an embodiment that is a combination of software and hardware. Moreover, the embodiments of the present disclosure may take a form of a computer program product implemented in a form of one or more computer-usable storage media (which include, but are not limited to, a magnetic storage device, CD-ROM, an optical storage device, etc.) having computer-usable program codes embodied therein.

The embodiments of the present disclosure are described with reference to flowcharts and/or block diagrams of methods, terminal devices (systems), and computer program products according to the embodiments of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing terminal device to produce a machine, such that an apparatus is created for implementing functions specified in one or more flows of a flowchart and/or one or more blocks of a block diagram through an execution of the instructions by the processor of the computer or other programmable data processing terminal device.

These computer program instructions may also be stored in a computer readable storage device capable of directing a computer or other programmable data processing terminal device to operate in a specific manner, so that instructions stored in the computer readable storage device generate an article of manufacture including an instruction apparatus. The instruction apparatus implements functions specified in one or more flows of a flowchart and/or one or more blocks of a block diagram.

These computer program instructions may also be loaded onto a computer or other programmable data processing terminal device, such that a series of operating operations are performed on the computer or other programmable terminal device to generate a computer-implemented process. The instructions executed in the computer or other programmable terminal device provide operations for implementing functions specified in one or more flows of a flowchart and/or one or more blocks of a block diagram.

Although the exemplary embodiments of the embodiments of the present disclosure have been described, one skilled in the art can make additional changes and modifications to these embodiments once the basic inventive concepts are learned. Therefore, the appended claims are intended to be interpreted as including the exemplary embodiments and all changes and modifications that fall within the scope of the embodiments of the present disclosure.

Finally, it should also be noted that relational terms such as first and second, etc., are only used to distinguish one entity or operation from another entity or operation in the present disclosure, and do not necessarily require or imply an existence of any such relationship or order between these operations or entities. Moreover, terms "include", "contain" or any other variations thereof are intended to cover a non-exclusive inclusion, such that a process, method, article, or terminal device that includes a series of elements includes not only these elements, but also includes other elements that are not explicitly listed, or also includes elements that are inherent in such process, method, article, or terminal device. Without any further limitation, an element defined by a statement "including a . . . " does not exclude a process, method, article, or terminal device including the element from further including another identical element.

A model training method and a model training apparatus provided in the present disclosure are described in detail above. The present disclosure uses specific examples for illustrating the principles and implementations of the present disclosure. The description of the above embodiments is merely used for facilitating the understanding of the methods and the core ideas of the present disclosure. At the same time, for one of ordinary skill in the art, changes can be made to specific implementations and application scopes based on the ideas of the present disclosure. In summary, the content of the present specification should not be construed as limitations to the present disclosure.

The present disclosure can be further understood using the following clauses.

Clause 1: A model training method comprising: reading a portion of sample data in a sample full set to form a sample subset; mapping a model parameter related to the portion of sample data from a first feature component for the sample full set to a second feature component for the sample subset; and training a model based on the portion of sample data having the second feature component.

Clause 2: The method of Clause 1, wherein reading the portion of sample data in the sample full set to form the sample subset comprises: reading the portion of sample data in the sample full set from a file storage system; and writing the portion of sample data into a specified area in the file storage system to form the sample subset.

Clause 3: The method of Clause 1 or 2, wherein mapping the model parameter related to the portion of sample data from the first feature component for the sample full set to the second feature component for the sample subset comprises: establishing a mapping relationship vector between the first feature component for the sample full set and the second feature component for the sample subset for the model parameter related to the portion of sample data; and mapping the model parameter related to the portion of sample data from the first feature component for the sample full set to the second feature component for the sample subset according to the mapping relationship vector.

Clause 4: The method of any one of Clauses 1-3, wherein training the model based on the portion of sample data having the second feature component comprises: reading the portion of sample data in each iteration; using the portion of sample data for training to obtain a training result; mapping the model parameter related to the portion of sample data from the second feature component for the sample subset to the first feature component for the sample full set; and sending a training result corresponding to the first feature component to a vector computer to update a model parameter corresponding to the first feature component in the model.

Clause 5: The method of Clause 4, wherein reading the sample data in the sample subset comprises: reading sample data of a sample subset pre-stored in a current sample computer; or reading sample data from a sample subset pre-stored in another sample computer when receiving sample transfer information of the other sample computer.

Clause 6: The method of Clause 4, wherein mapping the model parameter related to the portion of sample data from the second feature component for the sample subset to the first feature component for the sample full set comprises: reading a preset mapping relationship vector; and mapping the model parameter related to the portion of sample data from the second feature component for the sample subset to the first feature component for the sample full set according to the mapping relationship vector.

Clause 7: The method of Clause 4, wherein sending the training result corresponding to the first feature component to the vector computer comprises: adding a character sequence, the character sequence including an update identifier for the first feature component and a prohibit-to-update identifier for other feature components, the other feature component being feature components of the sample full set other than the first feature component; and sending the character sequence and the training result to the vector computer.

Clause 8: A model training apparatus comprising: a sample subset reading module configured to read a portion of sample data in a sample full set to form a sample subset; a feature vector mapping module configured to a map model parameter related to the portion of sample data from a first feature component for the sample full set to a second feature component for the sample subset; and a model training module configured to train a model based on the portion of sample data having the second feature component.

Clause 9: The apparatus of Clause 8, wherein the sample subset reading module comprises: a partial sample data reading sub-module configured to read the portion of sample data in the sample full set from a file storage system; and a partial sample data writing sub-module configured to write the portion of sample data into a specified area in the file storage system to form the sample subset.

Clause 10: The apparatus of Clause 8 or 9, wherein the feature vector mapping module comprises: a mapping relationship vector establishing sub-module configured to establish a mapping relationship vector between the first feature component for the sample full set and the second feature component for the sample subset for the model parameter related to the portion of sample data; and a sample subset mapping sub-module configured to map the model parameter related to the portion of sample data from the first feature component for the sample full set to the second feature component for the sample subset according to the mapping relationship vector.

Clause 11: The apparatus of any one of Clauses 8-10, wherein the model training module comprises: a second partial sample data reading sub-module configured to read the portion of sample data in each iteration; a training sub-module configured to use the portion of sample data for training to obtain a training result; a sample full set mapping sub-module configured to map the model parameter related to the portion of sample data from the second feature component for the sample subset to the first feature component for the sample full set; and a communication sub-module configured to send a training result corresponding to the first feature component to a vector computer to update model parameter corresponding to the first feature component in the model.

Clause 12: The Clause of claim 11, wherein the second partial sample data reading sub-module comprises: a first reading unit configured to read sample data of a sample subset pre-stored in a current sample computer; or a second reading unit configured to read sample data from a sample subset pre-stored in another sample computer when receiving sample transfer information of the other sample computer.

Clause 13: The apparatus of Clause 11, wherein the sample full set mapping sub-module comprises: a mapping relationship vector reading unit configured to read a preset mapping relationship vector; and a mapping relationship mapping unit configured to map the model parameter related to the portion of sample data from the second feature component for the sample subset to the first feature component for the sample full set according to the mapping relationship vector.

Clause 14: The apparatus of Clause 11, wherein the communication sub-module comprises: a character sequence adding unit configured to add a character sequence, the character sequence including an update identifier for the first feature component and a prohibit-to-update identifier for other feature components, the other feature component being feature components of the sample full set other than the first feature component; and a sending unit configured to add the character sequence and the training result to the vector computer.

What is claimed is:

1. A method implemented by one or more computing devices, the method comprising:
    reading a portion of sample data in a sample full set to form a sample subset, the sample full set being divided into a plurality of sample subsets;
    mapping a subset of model parameters related to the portion of sample data from a first feature component for the sample full set to a second feature component for the sample subset, a number of model parameters in the subset of model parameters being smaller than a number of model parameters included in a model to be trained; and
    training the subset of model parameters of the model based on the portion of sample data having the second feature component.

2. The method of claim 1, wherein reading the portion of sample data in the sample full set to form the sample subset comprises:
    reading the portion of sample data in the sample full set from a file storage system; and
    writing the portion of sample data into a specified area in the file storage system to form the sample subset.

3. The method of claim 1, wherein mapping the subset of model parameters related to the portion of sample data from the first feature component for the sample full set to the second feature component for the sample subset comprises:
    establishing a mapping relationship vector between the first feature component for the sample full set and the second feature component for the sample subset for the subset of model parameters related to the portion of sample data; and
    mapping the subset of model parameters related to the portion of sample data from the first feature component for the sample full set to the second feature component for the sample subset according to the mapping relationship vector.

4. The method of claim 1, wherein training the subset of model parameters of the model based on the portion of sample data having the second feature component comprises:
    reading the portion of sample data in each iteration;
    using the portion of sample data for training to obtain a training result;
    mapping the subset of model parameters related to the portion of sample data from the second feature component for the sample subset to the first feature component for the sample full set; and
    sending a training result corresponding to the first feature component to a vector computer to update model parameters corresponding to the first feature component in the model.

5. The method of claim 4, wherein reading the sample data in the sample subset comprises:
    reading sample data of a sample subset pre-stored in a current sample computer; or
    reading sample data from a sample subset pre-stored in another sample computer when receiving sample transfer information of the other sample computer.

6. The method of claim 4, wherein mapping the subset of model parameters related to the portion of sample data from the second feature component for the sample subset to the first feature component for the sample full set comprises:
    reading a preset mapping relationship vector; and
    mapping the subset of model parameters related to the portion of sample data from the second feature component for the sample subset to the first feature component for the sample full set according to the preset mapping relationship vector.

7. The method of claim 4, wherein sending the training result corresponding to the first feature component to the vector computer comprises:
    adding a character sequence, the character sequence including an update identifier for the first feature component and a prohibit-to-update identifier for other feature components, the other feature components being feature components of the sample full set other than the first feature component; and
    sending the character sequence and the training result to the vector computer.

8. An apparatus comprising:
    one or more processors;
    memory;
    a sample subset reading module stored in the memory and executable by the one or more processors to read a portion of sample data in a sample full set to form a sample subset, the sample full set being divided into a plurality of sample subsets;
    a feature vector mapping module stored in the memory and executable by the one or more processors to map a subset of model parameters related to the portion of sample data from a first feature component for the sample full set to a second feature component for the sample subset, a number of model parameters in the subset of model parameters being smaller than a number of model parameters included in a model to be trained; and
    a model training module stored in the memory and executable by the one or more processors to train the subset of model parameters of the model based on the portion of sample data having the second feature component.

9. The apparatus of claim 8, wherein the sample subset reading module comprises:
    a partial sample data reading sub-module configured to read the portion of sample data in the sample full set from a file storage system; and
    a partial sample data writing sub-module configured to write the portion of sample data into a specified area in the file storage system to form the sample subset.

10. The apparatus of claim 8, wherein the feature vector mapping module comprises:
- a mapping relationship vector establishing sub-module configured to establish a mapping relationship vector between the first feature component for the sample full set and the second feature component for the sample subset for the subset of model parameters related to the portion of sample data; and
- a sample subset mapping sub-module configured to map the subset of model parameters related to the portion of sample data from the first feature component for the sample full set to the second feature component for the sample subset according to the mapping relationship vector.

11. The apparatus of claim 8, wherein the model training module comprises:
- a second partial sample data reading sub-module configured to read the portion of sample data in each iteration;
- a training sub-module configured to use the portion of sample data for training to obtain a training result;
- a sample full set mapping sub-module configured to map the subset of model parameters related to the portion of sample data from the second feature component for the sample subset to the first feature component for the sample full set; and
- a communication sub-module configured to send a training result corresponding to the first feature component to a vector computer to update model parameters corresponding to the first feature component in the model.

12. The apparatus of claim 11, wherein the second partial sample data reading sub-module comprises:
- a first reading unit configured to read sample data of a sample subset pre-stored in a current sample computer; or
- a second reading unit configured to read sample data from a sample subset pre-stored in another sample computer when receiving sample transfer information of the other sample computer.

13. The apparatus of claim 11, wherein the sample full set mapping sub-module comprises:
- a mapping relationship vector reading unit configured to read a preset mapping relationship vector; and
- a mapping relationship mapping unit configured to map the subset of model parameters related to the portion of sample data from the second feature component for the sample subset to the first feature component for the sample full set according to the preset mapping relationship vector.

14. The apparatus of claim 11, wherein the communication sub-module comprises:
- a character sequence adding unit configured to add a character sequence, the character sequence including an update identifier for the first feature component and a prohibit-to-update identifier for other feature components, the other feature components being feature components of the sample full set other than the first feature component; and
- a sending unit configured to add the character sequence and the training result to the vector computer.

15. One or more computer readable media storing executable instructions that, when executed by one or more processors, cause the one or more processors to perform acts comprising:
- reading a portion of sample data in a sample full set to form a sample subset, the sample full set being divided into a plurality of sample subsets;
- mapping a subset of model parameters related to the portion of sample data from a first feature component for the sample full set to a second feature component for the sample subset, a number of model parameters in the subset of model parameters being smaller than a number of model parameters included in a model to be trained; and
- training the subset of model parameters of the model based on the portion of sample data having the second feature component.

16. The one or more computer readable media of claim 15, wherein mapping the subset of model parameters related to the portion of sample data from the first feature component for the sample full set to the second feature component for the sample subset comprises:
- establishing a mapping relationship vector between the first feature component for the sample full set and the second feature component for the sample subset for the subset of model parameters related to the portion of sample data; and
- mapping the subset of model parameters related to the portion of sample data from the first feature component for the sample full set to the second feature component for the sample subset according to the mapping relationship vector.

17. The one or more computer readable media of claim 15, wherein training the subset of model parameters of the model based on the portion of sample data having the second feature component comprises:
- reading the portion of sample data in each iteration;
- using the portion of sample data for training to obtain a training result;
- mapping the subset of model parameters related to the portion of sample data from the second feature component for the sample subset to the first feature component for the sample full set; and
- sending a training result corresponding to the first feature component to a vector computer to update model parameters corresponding to the first feature component in the model.

18. The one or more computer readable media of claim 17, wherein reading the sample data in the sample subset comprises:
- reading sample data of a sample subset pre-stored in a current sample computer; or
- reading sample data from a sample subset pre-stored in another sample computer when receiving sample transfer information of the other sample computer.

19. The one or more computer readable media of claim 17, wherein mapping the subset of model parameters related to the portion of sample data from the second feature component for the sample subset to the first feature component for the sample full set comprises:
- reading a preset mapping relationship vector; and
- mapping the subset of model parameters related to the portion of sample data from the second feature component for the sample subset to the first feature component for the sample full set according to the preset mapping relationship vector.

20. The one or more computer readable media of claim 17, wherein sending the training result corresponding to the first feature component to the vector computer comprises:
- adding a character sequence, the character sequence including an update identifier for the first feature component and a prohibit-to-update identifier for other feature components, the other feature components being feature components of the sample full set other than the first feature component; and sending the character sequence and the training result to the vector computer.

\* \* \* \* \*